United States Patent [19]
Yamada et al.

[11] Patent Number: 5,674,925
[45] Date of Patent: Oct. 7, 1997

[54] EPOXY RESIN MODIFIED WITH ALKANOL-BLOCKED PREPOLYMER AND BISURETHANE

[75] Inventors: Mitsuo Yamada, Suita; Ichiro Kawakami, Takatsuki, both of Japan

[73] Assignee: Nippon Paint Co., Ltd., Osaka, Japan

[21] Appl. No.: 556,193

[22] Filed: Nov. 9, 1995

[30] Foreign Application Priority Data

Nov. 10, 1994 [JP] Japan ................... 6-302939

[51] Int. Cl.$^6$ .................. C08K 5/04; C08L 63/02; C08L 75/08
[52] U.S. Cl. .............. 523/415; 523/404; 525/453; 525/454
[58] Field of Search ............... 525/453, 454; 523/404, 415

[56] References Cited

U.S. PATENT DOCUMENTS

| | | | |
|---|---|---|---|
| 3,886,228 | 5/1975 | Bolger | 528/45 |
| 4,296,167 | 10/1981 | Ceintrey | 528/45 |
| 4,435,558 | 3/1984 | Burba et al. | 528/45 |
| 4,496,672 | 1/1985 | Batzill et al. | 523/404 |
| 4,803,257 | 2/1989 | Goel | 528/45 |
| 5,138,011 | 8/1992 | Markusch et al. | 528/45 |
| 5,447,973 | 9/1995 | Yamada et al. | 523/415 |

*Primary Examiner*—Robert E. Sellers
*Attorney, Agent, or Firm*—Millen, White, Zelano, & Branigan, P.C.

[57] ABSTRACT

A diglycidyl ether epoxy resin is reacted with a blocked prepolymer having a soft segment and an asymmetric bisurethane having a first urethane group with a lower alkanol and a second urethane group with a monohydroxyl compound capable of enhancing thermoflowability. The product is then reacted with a cationic active hydrogen compound such as amines to open the remaining epoxy rings. The modified epoxy resin thus produced is dispersed in an aqueous medium containing a neutralizing agent together with a blocked polyisocyanate crosslinker to give a cathodic electrodeposition paint having improved impact strength and thermoflowability.

9 Claims, No Drawings

EPOXY RESIN MODIFIED WITH ALKANOL-BLOCKED PREPOLYMER AND BISURETHANE

BACKGROUND OF THE INVENTION

This invention relates to a modified epoxy resin. More particulary, it relates to the modified epoxy resin for use as a binder resin of cathodic electrodeposition paints.

Modified epoxy resins to be incorporated into cathodic electrodeposition paints are conventionally produced by reacting a starting epoxy resin with an amine to introduce a hydrophilic and electrically chargeable group into the resin. These resins may be thermally cured either by the reaction with an external crosslinker such as melamine resins or blocked polyisocyanates, or by the self-crosslinking reaction of a pendant blocked isocyanato moiety bound to a secondary alcoholic hydroxyl group present in the starting epoxy resin.

Since epoxy resins containing aromatic rings such as bisphenol epoxy resins generally produce a cured film having decreased flexibility, it is known that the flexibility may be improved by reacting the starting epoxy resin with an alkylphenol such as t-butylphenol or nonylphenol, or a long-chain fatty acid so that these components are introduced into the resin molecule by the ring opening reaction of a portion of epoxy rings with these components. Modified resins thus produced, however, have a defect that the curability thereof is decreased and the curing requires relatively high temperatures.

Another known approach for improving the flexibility is the use of an epoxy resin having a soft segment in the resin molecule. For example, bisphenol epoxy resins may be chain extended by the reaction with a bifunctional polyol containing the soft segment such as bifunctional polyether polyols. This approach has a defect that other performance of the cured film and corrosion resistance in particular are not satisfactory.

Japanese Patent Application No. 139589/93 assigned to the assignee of this application, corresponding to U.S. Pat. No. 5,447,973 and EP-A-0630929, discloses a modified epoxy resin for cathodic electrodeposition paints having a soft segment. This resin is produced by chain extending a diglycidyl epoxy resin with a difunctional urethane prepolymer containing the soft segment, and then reacting the resulting epoxy-terminated oxazolidone ring-containing resin with a cationic active hydrogen compound to open the epoxy ring.

It is often desirable for the modified epoxy resin to contain a component such as a long chain aliphatic alcohol, its alkylene glycol monoether or an alkylphenol (hereinafter collectively referred to as "thermoflowability enhancer") for improving the thermoflowability thereof and adjusting its molecular weight and/or amine equivalent weight. In the process disclosed in the above-cited Japanese application, this has been done by reacting an active hydrogen-containing thermoflowability enhancer with the soft segment-containing chain-extended epoxy resin to open a portion of the epoxy rings and then reacting a cationic active hydrogen compound to open the remaining epoxy rings. Thus, the resulting modified epoxy resin has a soft segment incorporated in the resin backbone via a pair of oxazolidone rings and a thermoflowability enhancer attached to the resin via a 2-hydroxypropylene linkage.

It would be desirable to further improve the properties of this type of resins and also simplify the method of production of the same.

SUMMARY OF THE INVENTION

The present invention provides a method for producing a modified epoxy resin for use in the preparation of cathodic electrodeposition paints. The method comprises the steps of:

reacting (a) a glycidyl ether epoxy resin with (b) a difunctional prepolymer produced by reacting a difunctional active hydrogen compound containing a soft segment with an excess of an organic diisocyanate, said prepolymer being blocked with a lower alkanol, and (c) an asymmetric bisurethane produced by converting one of isocyanato groups of said organic diisocyanate to a first urethane group by the reaction with said lower alkanol and converting the other isocyanato group to a second urethane group by the reaction with an aliphatic monoalcohol having 8 or more carbon atoms, an alkylene glycol monoether of said aliphatic monoalcohol, or an alkylphenol, the proportions of said reactant (a) and (c) being from 2 to 10 moles and from 0.5 to 3 moles per mole of said reactant (b), respectively; and reacting the resulting product with a cationic active hydrogen compound to open the remaining epoxy rings thereof.

The inventive method gives a modified epoxy resin having incorporated therein a soft segment and a thermoflowability enhancer commonly attached to the resin molecule through an oxazolidone ring having a high cohesive force. This results in a coating film having a high glass transition temperature (Tg) and a high thermal decomposition temperature.

The present invention also enables the production of a cationically modified epoxy resin containing both a soft segment and a thermoflowability enhancer in fewer steps. This is because both of the soft segment and thermoflowability enhancer are attached to the resin molecule through the same type oxazolidone ring. This is accomplished by reacting a glycidyl ether epoxy resin with both of the modifying components each having a blocked isocynate moiety simultaneously.

DETAILED DESCRIPTION OF THE INVENTION

The modified epoxy resin of the present invention is produced from a glycidyl ether epoxy resin (a). Typical examples thereof include polyphenol polyglycidyl ether type epoxy resins produced by reacting a polycyclic polyphenol such as bisphenol A, bisphenol F or bisphenol S with epichlorohydrine. A variety of bisphenol epoxy resins are commercially available including EPIKOTE 827 (epoxy equivalent 180–190), EPIKOTE 1001 (epoxy equivalent 450–500), EPIKOTE 1010 (epoxy equivalent 3000–4000), all sold by Yuka Shell Epoxy K.K.

For use as a starting resin, bifunctional epoxy resins may be chain extended using the reaction with bifunctional polyphenols, polycarboxylic acids or polyisocyanates or polyamines. Bisphenols such as bisphenol A or bisphenol F and aliphatic or aromatic dicarboxylic acids such as succinic, adipic, phthalic, isophthalic or terephthalic acid may also be used in the chain extending reaction.

Chain extending reactions of bifunctional epoxy resins with an organic diisocyanate are disclosed in Iwakura et al., J. Polymer Sci., Part A-1, 4, 751 (1966) and Sander et al., J. Appl. Polymer Sci., 9, 1984 (1966). Chain extended epoxy resins resulting from these reactions contain a plurality of oxazolidone rings in the resin backbone. The starting epoxy resin (a) may have an epoxy equivalent weight from 100 to 5,000, preferably from 150 to 2,000. Mixtures of resins having different epoxy equivalent weights may also be used. For example, a bisphenol epoxy resin having an epoxy equivalent weight from 150 to 300 may be blended with a bisphenol epoxy resin having an epoxy equivalent weight from 300 to 2,000 in such a proportion that the number of epoxy groups in the mixture occupies from 50 to 90% of the total number of the epxoy groups. The blocked urethane prepolymer (b) used in the first step is produced by reacting a bifunctional active hydrogen compound having a soft segment with a blocked diisocyanate. Examples of usable diisocyanates include aromatic diisocyanates such as tolylenediisocyanate (TDI), xylylenediisocyanate (XDI), 4,4'-diphenylmethanediisocyanate isocyanate (MDI) and the like; and aliphatic and alicyclic diisocyanates such as hexamethylenediisocyanate (HMDI), isophoronediisocyanate (IPDI), 4,4-methylenebis(cyclohexylisocyanate), trimethylhexamethylenediisocyanate and the like.

A variety of blocking agents are well-known in the art. However, a lower alkanol is used in the present invention for blocking the free isocyanate group. This is advantageous because the blocked isocyanato group may easily unblocked and the liberated blocking agent may be removed from the reaction mixture with ease. Methanol or ethanol is preferable.

As stated before, the present invention differs from the prior art in that the starting epoxy resin is reacted not directly with the bifunctional soft segment-containing active hydrogen compound but with a blocked prepolymer produced therefrom by the reaction with a blocked diisocyanate. Thus the soft segment is incorporated in the chain extend epoxy resin molecule through oxazolidone rings formed by the reaction of the epoxy ring and the blocked isocyanato group as reported in Iwakura et al. supra.

The difunctional active hydrogen compound to be used for this purpose may be the same as the compound used for directly chain extending the epoxy resin in the prior art methods. Specific examples thereof include polyether diols produced by addition-polymerizing an alkylene oxide such as ethylene oxide, propylene oxide, or tetrahydrofuran using a bifunctional initiator such as bisphenol A; polyester diols such as polyalkylene adipate or polycaprolactone diol; polyoxyalkylene diamines such as polyoxypropylene diamine; alkylenediamines containing more than five carbon atoms such as hexamethylenediamine; long chain aliphatic dicarboxylic acids having more than 5 carbon atoms such as dimer acid; carboxyl-terminated nitrile rubber oligomer and hydroxyl-terminated polybutadiene oligomer. Polyether diols produced by addition reacting 4 to 8 moles of ethylene oxide or propylene oxide are preferable.

Blocked prepolymers may preferably produced by blocking the organic diisocyanate with methanol or ethanol and then reacting the blocked diisocyanate with the bifunctional active hydrogen compound. It is, of course, possible to carry out the above reaction sequence in reverse order. Thus, the blocked prepolymer may be produced by reacting the bifunctional active compound with the organic diisocyanate and then blocking the resulting free isocyanate prepolymer with methanol or ethanol. In the above reactions, the equivalent ratio of isocyanato group to active hydrogen atom must be equal to or slightly excess of 2.

The thermoflowability enhancer used in the present invention is a monohydroxyl compound selected from the group consisting of an aliphatic alcohol having 8 or more carbon atoms such as 2-ethylhexanol, an alkylene glycol monoether of said aliphatic alcohol such as ethylene glycol mono-2-ethylhexyl ether, and an alkylphenol such as t-butylphenol or nonylphenol. The asymmetric bisurethane (c) may be produced from an organic diisocyanate by reacting one of its isocyanato groups with the above monohydroxyl compound and reacting the other isocyanate group with a lower alkanol blocking agent such as methanol or ethanol. In practice, the bisurethane (c) may easily produced by reacting an organic diisocyanate fully blocked with methanol or ethanol with a stoichiometric amount of the above monohydroxyl compound.

The reaction of the epoxy resin (a) with the blocked prepolymer (b) and bisurethane (c) will give a resin typically having the following structural formula:

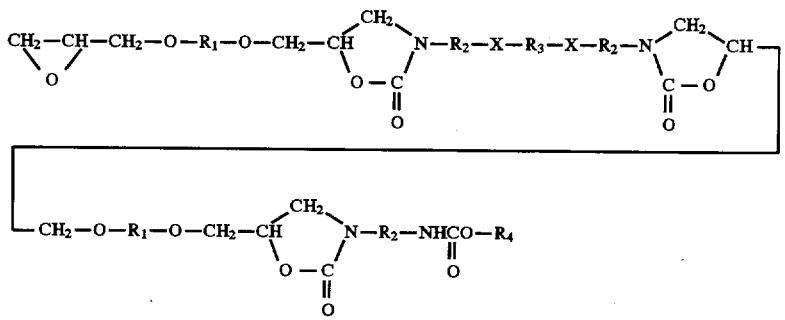

wherein $R_1$ is the residue of an epoxy resin, $R_2$ is the residue of an organic diisocyanate, $R_3$ is the residue of a difunctional active hydrogen compound containing a soft segment, $R_4$ is the residue of a thermoflowability enhancer, and x is a urethane, urea or amide linkage. The reaction of (a) with (b) and (c) may be carried out stepwise by reacting first with (b) and then with (c) and vice versa. Alternatively, all reactants (a), (b) and (c) may be reacted simultaneously.

In a preferred embodiment, whole amounts of diioscyanate required are fully blocked with methanol or ethanol. To this is added the monohydroxyl compound and allowed to react. Then the difunctional active hydrogen compound is added and allowed to react whereupon a mixture of reactants (b) and (c) is produced. Finally, the epoxy resin (a) is added to the mixture and allowed to react. The reaction may be carried out at a temperature from 60° C. to 200° C. while distilling off methanol or ethanol produced as a reaction by-product.

As will be apparent from the above structural formula, two moles of (a) and one mole of (c) per mole of (b) are necessary in theory in the reaction of the first step. In practice, these molar ratios may vary from 2 to 10 moles for (a) and from 0.5 to 3 moles for (c) per mole of (b). However, the NCO equivalent number of organic diisocyanate to be initially blocked with methanol or ethanol should be greater than the total active hydrogen equivalent number of the combination of the difunctional active hydrogen compound and the monohydroxyl compound but less than the epoxy equivalent number of resin (a). In other words, a portion of epoxy groups possessed by (a) should remain in the end product of the first step. Accordingly, the end product of the first step may contain, in addition to the resin of the above structural formula, minor amounts of the reaction products of resin (a) solely with blocked diisocyanate reactant (b) and reactant (c), respectively.

In the second step, a cationic active hydrogen compound is used to open the remaining epoxy rings in the product of the first step. Examples of usable cationic active hydrogen compounds include primary or secondary amines such as butylamine, octylamine, diethylamine, dibutylamine, methylbutylamine, monoethanolamine, diethanolamine or N-methylethanolamine, tertiary amine-acid addition salts such as triethylamine hydrochloride or N,N-dimethylethanolamine acetate, and sulfide-acid mixtures such as diethylsulfide-acetic acid mixture. Ketimines of a primary amine such as aminoethylethanolamine or diethylenetriamine may also be used. Any combination of these amines and ketimines may also be used. Care should be taken when using a primary amine because it also plays the role of a chain extender and renders the resin too viscous. For use as binder resins, it is preferable for the resulting modified resin to have an amine equivalent from 0.3 to 4.0 meq/g. If the amine equivalent is too low, emulsification or dispersion in an aqueous medium becomes difficult. Conversely, if the amine equivalent is too high, it is hardly possible to give a film having a satisfactory water resistance.

The modified epoxy resins of the present invention may be cured with the aid of external crosslinkers such as blocked polyisocyanates. When formulated in cathodic electrodeposition paints, their characteristic performance may be exhibited to the fullest extent. As discussed before, conventional modified epoxy resins are not satisfactory in the reactivity with crosslinkers and other properties. The modified epoxy resin of the present invention satisfies with not only the reactivity with crosslinkers and impact strength but also other performance including emulsifiability, thermal flowability, corrosion resistance and heat resistance. Particularly, when a bisphenol epoxy resin having an epoxy equivalent weight from 150 to 300 and another bisphenol epoxy resin having an epoxy equivalent weight from 300 to 2,000 are used in combination as the starting epoxy resin (a), the throwing power and workability with galvanized steel substrates may also be improved.

For preparing electrodeposition paints, the modified resins of the present invention is dispersed together with a blocked polyisocyanate crosslinker in an aqueous medium containing a neutralizing agent. The neutralizing agent is, of course, an acid such as hydrochloric acid, nitric acid, phosphoric acid, formic acid, acetic acid, lactic acid, sulfamic acid or acetylglycine.

The amount of crosslinking agent must be sufficient to give a rigid film through a crosslinking reaction with amino, hydroxyl or carboxyl groups contained in the resin and generally ranges from 5 to 50% by weight of the modified resin on solid basis. The amount of neutralizing agent is such that at least 20%, preferably 30 to 60% neutralization of the modified resin may be achieved.

The paint formulation may contain 0.1 to 5% by weight of the blocked polyisocyanate of a catalyst such as dibutyltin dilaurate, dibutyltin oxide or other urethane-cleaving catalysts. The paint formulation may, of course, contain a variety of conventional additives depending upon its particular application. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like. The resulting water-borne paints may be applied on a substrate not only by the electrodeposition process but also by spraying, dipping and other conventional methods.

The following examples are intended to further illustrate the invention without limiting thereto. All part and percents therein are by weight unless otherwise indicated. All epoxy equivalents and amine or base equivalents therein are on dry contents basis.

EXAMPLE 1

A flask equipped with a stirrer, condenser, nitrogen gas tube, thermometer and drip funnel was charged with 71.34 g of 2,4-/2,6-tolylenediisocyanate(80:20 weight ratio) 111.98 g of methyl isobutyl ketone (MIBK) and 0.02 g of dibutyltin dilaurate. To the mixture was added dropwise 14.24 g of methanol over 30 minutes while stirring and nitrogen gas bubbling. The inner temperature rose to 60° C. during this period. After continuing the reaction for additional 30 minutes, 46.98 g of ethylene glycol mono-2-ethylhexyl ether was added dropwise over 30 minutes. The inner temperature rose to 70°–75° C. during this period. After continuing the reaction for additional 30 minutes, 41.2 g of bisphenol A-propylene oxide (5 moles) adduct (BP-5P sold by Sanyo Chemical Industries, Ltd.) was added and allowed to react at 90° C. until the absorption of NCO group disappeared in the IR spectrometry.

Then 475.0 g of bisphenol A epoxy resin having an epoxy equivalent weight of 475 (YD-7011R sold Toto Kasei Co., Ltd.) was added to the flask and allowed to make a uniform solution. Water was removed from the mixture as an azeotropic mixture with MIBK while raising the inner temperature from 130° C. to 142° C. After cooling to 125° C., the mixture was allowed to react with the addition of 1,107 g of benzyldimethylamine while distilling off methanol until an epoxy equivalent weight of 1140 was reached.

After cooling to 100° C., 24.56 g of N-methylethanolamine 11.46 g of diethanolamine and 26.08 g of aminoethylethanolamine ketimine (79.0% solution in MIBK) were added to the reaction mixture and allowed to react at 110° C. for 2 hours. The product was diluted with 20.74 g of ethylene glycol mono-2-ethylhexyl ether and 12.85 g of MIBK to 82% nonvolatiles. A modified epoxy resin having a number average molecular weight of 1380 (GPC method) and an amine equivalent of 94.5 meq/100 g was obtained.

EXAMPLE 2

A flask equipped with a stirrer, condenser, nitrogen gas tube, thermometer and drip funnel was charged with 78.3 g of 2,4-/2,6-tolylenediisocyanate(80:20 weight ratio), 19.64 g of MIBK and 0.10 g of dibutyltin dilaurate. To the mixture was added dropwise 15.4 g of methanol over 30 minutes while stirring and nitrogen gas bubbling. The inner temperature rose to 60° C. during this period. After continuing the reaction for additional 30 minutes, 43.5 g of ethylene glycol mono-2-ethylethyl ether was added dropwise over 30 minutes. After continuing the reaction for additional 30 minutes, 55.0 g of bisphenol A-propylene oxide (5 moles) adduct (BP-5P sold by Sanyo chemical Industries, Ltd.) was added and allowed to react at 60°–65° C. until the absorption of NCO group disappeared in the IR spectrometry.

Then 380.0 g of bisphenol A epoxy resin having an epoxy equivalent weight of 475 (YD-7011R sold by Toto Kasei Co., Ltd.), 56.4 g of bisphenol epoxy resin having an epoxy equivalent weight of 188 (YD-128R sold by Toto Kasei Co., Ltd.) and 109.1 g of MIBK were added to the flask and allowed to make a uniform solution. After the addition of 1.10 g of benzyldimethylamine, the mixture was allowed to react at 120° C. while distilling off methanol until an epoxy equivalent weight of 1094 was reached.

After cooling to 100° C., 30.91 g of N-methylethanolamine and 25.52 g of aminoethylethanolamine ketimine (79.0% solution in MIBK) were added to the reaction mixture and allowed to react at 100° C. for 90 minutes. The product was diluted with 20.08 g of ethylene glycol mono-2-ethylehexyl ether to 82% nonvolatiles. A modified epoxy resin having a number average molecular weight of 1340 (GPC method) and an amine equivalent of 94.5 meq/100 g was obtained.

EXAMPLE 3

A flask equipped with a stirrer, condenser, nitrogen gas tube, thermometer and drip funnel was charged with 78.3 g of 2,4-/2,6-tolylenediisocyanate (80:20 weight ratio), 9.64 g of MIBK and 0.10 g of dibutyltin dilaurate. To the mixture was added dropwise 15.4 g of methanol over 30 minutes while stirring and nitrogen gas bubbling. The inner temperature rose to 60° C. during this period. After continuing the reaction for additional 30 minutes, 43.5 g of ethylene glycol mono-2-ethylethyl ether was added dropwise over 30 minutes. After continuing the reaction for additional 30 minutes, 55.0 g of bisphenol A-propylene oxide (5 moles) adduct (BP-5P sold by Sanyo Chemical Industries, Ltd.) was added and allowed to react at 60°–65° C. until the absorption of NCO group disappeared in the IR spectrometry.

Then 285.0 g of bisphenol A epoxy resin having an epoxy equivalent weight of 475 (YD-7011R sold Toto Kasei Co., Ltd.), 95.0 g of bisphenol epoxy resin having an epoxy equivalent weight of 188 (YD-128R sold by Toto Kasei Co., Ltd.) and 94.7 g of MIBK were added to the flask and allowed to make a uniform solution. After the addition of 1.10 g of benzyldimethylamine, the mixture was allowed to react at 120° C. while distilling off methanol until an epoxy equivalent weight of 1090 was reached.

After cooling to 100° C., 28.14 g of N-methylethanolamine and 23.23 g of aminoethylethanolamine ketimine (79.0% solution in MIBK) were added to the reaction mixture and allowed to react at 100° C. for 90 minutes. The product was diluted with 18.54 g of ethylene glycol mono-2-ethylhexyl ether to 82% nonvolatiles. A modified epoxy resin having a number average molecular weight of 1200 (GPC method) and an amine equivalent of 100 meq/100 g was obtained.

Comparative Example 1

The same reactor as used in Example 1 was charged with 285.0 g of bisphenol A epoxy resin having an epoxy equivalent of 475, 380 g of bisphenol A epoxy resin having an epoxy equivalent of 950, 77.0 g of p-nonylphenol and 82.4 g of MIBK. After the addition of 3.0 g of dimethylbenzylamine, the mixture was allowed to react at 130° C. until an epoxy equivalent weight of 1140 was reached. After cooling, the product was allowed to react with a mixture of 19.2 g of diethanolamine, 27.0 g of N-methylaminoethanol and 30.6 g of aminoethylethanolamine ketimine (79% solution in MIBK) at 110° C. for two hours, and diluted to 90% nonvolatiles with MIBK to obtain a modified epoxy resin having a number average molecular weight of 2100 and an amine equivalent of 90 meq/100 g.

EXAMPLE 4

Pigment Paste

A flask equipped with a stirrer, condenser, nitrogen gas tube, thermometer and drip funnel was charged with 382.20 g of bisphenol A epoxy resin having an epoxy equivalent weight of 188 (DER-331J sold by Dow Chemical Co.) and 111.98 g of bisphenol A. The mixture was heated to 80° C. to make a uniform solution and then allowed to react at 170° C. for 2 hours with the addition of 1.53 g of 1% solution of 2-ethyl-4-methylimidazole. After cooling to 140° C., 196.50 g of 2-ethylhexanol-half blocked isophoronediisocyanate (90% nonvolatiles) was added to the reaction mixture and allowed to react until the absorption of NCO group disappeared in the IR spectrometry. After duluting with 205.0 g of dipropylene glycol monobutyl ether, the reaction product was reacted with a mixture of 408.0 g of 1-(2-hydroxyethylthio)-2-propanol, 134.0 g of dimethylpropionic acid and 144.0 g of deionized water at 70° C. until an acid number of less than 5 was reached. The resulting resin was finally diluted with 1150.5 g of deionized water to 35% nonvolatiles and used as a pigment dispersion resin.

A pigment paste was prepared by milling the following mixture in a sand grind mill.

| Material | Amount, gram |
| --- | --- |
| Pigment dispersion resin (35% N.V.) | 71.42 |
| Aluminum silicate | 15.00 |
| Titanium dioxide | 82.00 |
| Basic lead silicate | 1.00 |
| Carbon black | 2.00 |
| Deionized water | 30.17 |

EXAMPLE 5

Crosslinker

A flask equipped with a stirrer, condenser, nitrogen gas tube, thermometer and drip funnel was charged with 199 g of hexamethylenediisocyanate trimer (CORONATE HX sold by Nippon Polyurethane K.K.), 32 g of MIBK and 0.03 g of dibutyltin dilaurate. To this was added dropwise 87.0 g of methyl ethyl ketoxime over 1 hour with stirring and nitrogen gas bubbling. The inner temperature was controlled initially at 50° C. and then at 70° C. Thereafter, the reaction was continued at 70° C. for 1 hour until the absorption of NCO group disappeared in the IR spectrometry. The product was diluted with 0.74 g of n-butanol and 39.93 g of MIBK to 80% nonvolatiles.

EXAMPLE 6

A mixture of 91.46 g (75 g as solids) of the modified epoxy resin of Example 1 and 31.25 g (25 g as solids) of the crosslinker of Example 5 was warmed to 70° C., and added gradually with stirring to 41.46 g of deionized water containing 1.44 g of acetic acid to make a uniform dispersion. After diluting with deionized water to 36% solids, the dispersion was mixed with 201.61 g of the pigment paste of Example 4 and 2.0 g of ethylene glycol monohexyl ether. An electrodeposition paint was prepared by diluting the above dispersion with deionized water to 20% nonvolatiles.

The paint was applied electrically on a zinc phosphate treated steel plate to a dry film thickness of 20 μm, baked at 160° C. for 20 minutes, and tested for the performance of cured film. The results are shown in Table 1.

EXAMPLE 7

Example 6 was followed except that the modified epoxy resin of Example 1 was replaced by the modified epoxy resin of Example 2. The results are shown in Table 1.

EXAMPLE 8

Example 6 was followed except that the modified epoxy resin of Example 1 was replaced by the modified epoxy resin of Example 3.

Comparative Example 2

Example 6 was followed except that the modified epoxy resin of Example 1 was replaced by the modified epoxy resin of Comparative Example 1 and the ratio of modified resin to pigment paste as solids was changed to 75:25. The results are shown in Table 1.

TABLE 1

| Item | Ex. 6 | Ex. 7 | Ex. 8 | Comp. Ex. 2 |
|---|---|---|---|---|
| Appearance, Ra in μm[1] | 0.22 | 0.25 | 0.24 | 0.23 |
| Salt spray[2] | Good | Good | Good | Fair |
| Impact strength at −5° C.[3] | Good | Good | Good | Fair |
| Throwing power in μm[4] | 7–9 | 12 | 12 | 5–6 |
| Workability on galvanized steel plate in Volt[5] | 220 | 280 | 280 | 200 |

Test method

1) Determined by Surface Roughness Meter Model E-30A sold by Tokyo Seimitsu K. K.

2) According to JIS-K5400.

Good: no change; Fair: detectable blister;

Bad: blister on the entire surface

3) Ball dropping test (500 g×50 cm) at −5° C.

Good: no change; Fair: partly peeled;

Bad: largely peeled

4) Determined by a four plates box type throwing power tester published in Techono-Cosmos vol. 3 (1993), 44–51. Briefly, four zinc phosphate treated plates each having a centrally defined perforation are placed in the paint bath in parallel at a distance of 200 mm therebetween to form a cathode collectively. Using this arrangement, a DC current is passed between the cathode and the anode until a film thickness of 25 μm is obtained on the closest plate to the anode. The throwing power is evaluated in terms of the film thickness in μm on the remotest plate to the anode.

5) The maximum voltage at which no pinhole is formed on the paint film when applied on a galvanized steel plate.

We claim:

1. A cathodic electrodeposition paint comprising a (1) modified epoxy resin obtained by reacting in a first step (a) a glycidyl ether epoxy resin with (b) a difunctional prepolymer produced by reacting a difunctional active hydrogen compound containing a soft segment with an excess of an organic diisocyanate, said prepolymer blocked with a lower alkanol, and (c) an asymmetric bisurethane produced by converting one of the isocyanate groups of said organic diisocyanate to a first urethane group by reaction with a lower alkanol and converting the other isocyanate group to a second urethane group by reaction with a monohydroxyl compound selected from the group consisting of an aliphatic monoalcohol having 8 or more carbon atoms, an alkylene glycol monoether of said aliphatic monoalcohol, and an alkylphenol wherein the proportions of said reactants (a) and (c) are from 2 to 10 moles of (a) and from 0.5 to 3 moles of (c) per mole of (b), and reacting in a second step the resultant product with a cationic active hydrogen compound to open the remaining epoxy rings thereof; and (2) a blocked polyisocyanate crosslinker, wherein the modified epoxy resin and crosslinker are dispersed in an aqueous medium containing a neutralizing agent.

2. The cathodic electrodeposition paint 1 according to claim 1, wherein said difunctional active hydrogen compound containing a soft segment is a polyether diol, a polyester diol, a polyoxyalkylene diamine, a long chain aliphatic dicarboxylic acid, a carboxyl-terminated nitrile rubber oligomer, or a hydroxyl-terminated polybutadiene oligomer.

3. The cathodic electrodeposition paint according to claim 1, wherein said lower alkanol is methanol or ethanol.

4. The cathodic electrodeposition paint according to claim 1, wherein reactants (b) and (c) are produced in a mixture by the steps of blocking a given amount of said organic diisocyanate with methanol or ethanol, reacting a portion of the blocked diisocyanate with said monohydroxyl compound at a blocked NCO to OH equivalent ratio of equal to or greater than 2, and reacting the remainder of said blocked diisocyanate with said difunctional active hydrogen compound at a block NCO to active hydrogen atom equivalent ratio of equal to or greater than 2, and wherein said reactant (a) is reacted with said mixture in the first step.

5. The cathodic electrodeposition paint according to claim 1, wherein said organic diisocyanate is an aromatic diisocyanate.

6. The cathodic electrodeposition paint according to claim 1, wherein said difunctional active hydrogen compound is an adduct of bisphenol A with ethylene oxide or propylene oxide.

7. The cathodic electrodeposition paint according to claim 1, wherein said epoxy resin has an epoxy equivalent weight from 100 to 5,000.

8. The cathodic electrodeposition paint according to claim 1, wherein said epoxy resin is a mixture of a bisphenol epoxy resin having an epoxy equivalent weight from 150 to 300 and a bisphenol epoxy resin having an epoxy equivalent weight of greater than 300.

9. The cathodic electrodeposition paint 1, wherein said cationic active hydrogen compound is a primary or secondary amine, a tertiary amine-acid addition salt, or a sulfide-acid mixture.

* * * * *